United States Patent [19]

Fink et al.

[11] Patent Number: 4,886,551

[45] Date of Patent: Dec. 12, 1989

[54] METHOD FOR IMPROVING THE SCRATCH RESISTANCE AND INCREASING THE SLIDING ABILITY OF COATED SURFACES AND IMPROVED COATING MATERIALS

[75] Inventors: Hans-Ferdi Fink, Essen; Roland Berger, Bochum; Wernfried Heilen, Alpen; Peter Muss, Essen, all of Fed. Rep. of Germany

[73] Assignee: Th. Goldschmidt AG, Essen, Fed. Rep. of Germany

[21] Appl. No.: 106,560

[22] Filed: Oct. 6, 1987

[30] Foreign Application Priority Data

Oct. 31, 1986 [DE] Fed. Rep. of Germany ....... 3637155

[51] Int. Cl.$^4$ .................. C08L 1/08; C07C 101/72
[52] U.S. Cl. .................. 106/183; 106/199; 106/243; 106/264; 106/267; 524/267; 524/268; 556/443; 556/444; 556/446
[58] Field of Search .............. 556/444, 450, 451, 443, 556/444, 446; 524/43, 268, 267; 106/199, 183, 243, 264, 267

[56] References Cited

U.S. PATENT DOCUMENTS

| | | | |
|---|---|---|---|
| 3,111,535 | 11/1963 | Nitzsche et al. | 556/446 |
| 3,480,583 | 11/1969 | Bailey et al. | 556/444 |
| 3,532,732 | 10/1970 | Rossmy et al. | 556/446 |
| 3,980,688 | 9/1976 | Litteral | 556/446 |
| 4,552,910 | 11/1985 | Deubzer | 524/43 |
| 4,804,737 | 2/1989 | Berger | 556/446 |

*Primary Examiner*—Theodore Morris

*Attorney, Agent, or Firm*—Toren, McGeady & Associates

[57] ABSTRACT

Compounds of the general formula

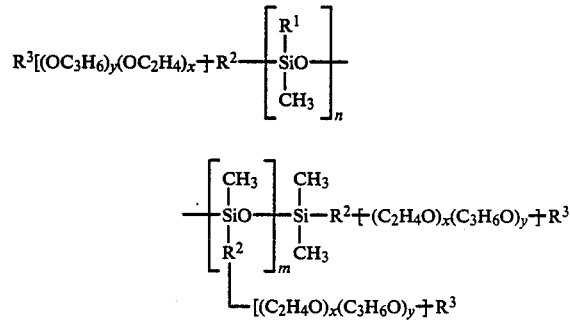

wherein
$R^1$ is alkyl with 1 to 8 carbon atoms,
$R^2$ is —O— or —$(CH_2)_pO$—, in which p=2, 3 or 4,
$R^3$ is hydrogen, alkyl with 1 to 4 carbon atoms or acyl,
n is 40 to 60
m is 0 to 3, x and y being selected so that the molecular weight of the polyoxyalkylene block is 1400 to 3000 and the molar ratio of x:y is 0.8 to 2.2, are added to coating compositions, such as paint, varnish or lacquer, in amounts of 0.001 to 0.5% by weight, based on the coating composition. This improves the scratch resistance and the sliding ability of the cured coatings.

12 Claims, No Drawings

METHOD FOR IMPROVING THE SCRATCH RESISTANCE AND INCREASING THE SLIDING ABILITY OF COATED SURFACES AND IMPROVED COATING MATERIALS

FIELD OF INVENTION

The invention is generally directed to the coating of substrates, such as wood and metal, and is particularly concerned with improving the scratch resistance and sliding capability of coated surfaces.

Considered from another aspect, the invention provides improved coating materials which, upon application to a substrate, result in scratch resistant coatings of high sliding ability. The term "coating" for the purposes of this invention, is deemed to refer to lacquers, varnishes and paints, hereinafter collectively referred to as "paints".

In the industrial production of objects with painted surfaces, the handling of the objects with freshly, and especially hot painted surfaces creates difficulties. For example, in the volume production of objects from materials derived from wood, such as door leaves, cabinet walls, table tops, etc., it is frequently not avoidable that the painted articles which are taken from the belt after the paint has cured and are then stacked, suffer damage at the painted surface. Similar problems arise when sheet metal is painted, for example, during the so-called coil-coating process. The problem of the occurrence of surface damage to the paint is also known in the automobile industry, especially when transporting and installing painted car body parts.

BACKGROUND INFORMATION AND PRIOR ART

Attempts have been made in the past to improve the handling of freshly painted objects by adding friction reducing additives, such as oils or waxes to the paint prior to application or after the coating procedure. However, when such waxes are added, problems arise with the compatibility of these compounds with the paint systems. The development of a defect-free paint film is also frequently disrupted or impeded by the addition of these substances. The subsequent addition of wax on the paint layer is also not satisfactory, since such a procedure increases the manufacturing costs and, moreover, the protective layers must be applied at the end of the manufacturing process.

Investigations into improving the scratch resistance and increasing the sliding ability of painted surfaces have not been published previously. In particular, there have been no systematic studies of the mode of action of relevant additives and of the functional relationship between the properties of these additives and their structure. The compounds used in practice have usually been discovered empirically.

There is therefore a need, in practice, for a paint additive, which improves the ability to handle especially those objects, which are painted on a production line. In particular, these additives are to improve the scratch resistance of the freshly painted surfaces and the sliding ability of painted surfaces. At the same time, such additives should be largely unaffected by the nature and composition of the paint to which they are added for the improvement of the aforementioned properties, and be universally usable. Moreover, the additivdes should be effective in the smallest possible amounts and should not adversely affect the application properties of the paint. In particular, they should not interfere with the formation of a surface film and the curing of the paint. Moreover, they ought not to have a disadvantageous effect on the stability of the paint with regard to any deposition or floating of the pigments and should not adversely affect the flow properties.

OBJECT OF THE INVENTION

It is the primary object of the invention to provide compounds, which fulfill the aforementioned requirements and are effective in very small amounts.

It is also an object of the invention to provide a simple method for improving the properties of coating materials to result in painted surfaces of superior scratch resistance and excellent sliding capability.

Generally, it is an object of the invention to improve on the art of coating materials and painted surfaces.

SUMMARY OF THE INVENTION

It has been surprisingly ascertained that these objects are superiorly met by adding to the paint, prior to application, compounds of the general formula

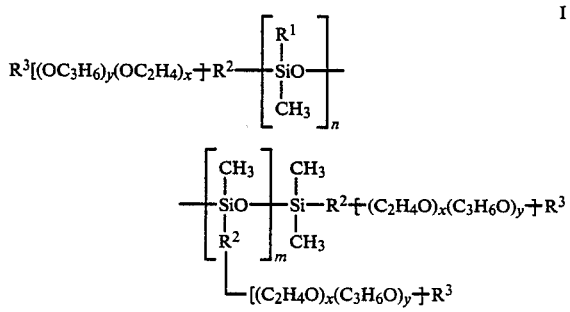

wherein
$R^1$ is alkyl with 1 to 8 carbon atoms,
$R^2$ is —O— or —$(CH_2)_pO$—, in which p =2, 3 or 4,
$R^3$ is hydrogen, alkyl when 1 to 4 carbon atoms or acyl,
n is 40 to 60
m is 0 to 3,
x and y being selected so that the molecular weight of the polyoxyalkylene block is 1400 to 3000 and the molar ratio of x : y is 0.8 to 2.2, in amounts of 0.001 to 0.5% by weight, based on the paint.

$R^1$ is preferably methyl. $R^1$ may, however, also be alkyl with up to 8 carbon atoms. The alkyl groups with 3 to 8 carbon atoms may be branched; however, linear alkyl groups are preferred.

$R^2$ is a bivalent group, which links the siloxy unit to a polyoxyalkylene block. The linkage between the Si atom of the siloxy unit and the carbon atom of the polyoxyalkylene block may be brought about through an oxygen atom or a carbon atom.

$R^3$ is hydrogen, alkyl with 1 to 4 carbon atoms or acyl. Preferably, $R^3$ is hydrogen. Acetyl is preferred as the acyl group.

The numerical values of the subscripts n and m are of essential importance for the properties of the compounds. The number of methylalkylsiloxy units is indicated by n, which also determines the chain length of the block copolymers. In the compounds to be used pursuant to the invention, n has a numerical value from 40 to 60. It is well known to those skilled in the art that the compounds are present in the form of a mixture with a distribution, which is essentially controlled by the laws of statistics. The value of n therefore represents an average value of the number of methylalkylsiloxy units.

The value of m ranges from 0 to 3 and is preferably from 0 to 2. If m=0, the compounds are linear siloxanes, which have terminal polyoxyalkylene units. If m>0, polyoxyalkylene units are also linked laterally to the chain. It has been ascertained that this structure of the block copolymer is of decisive importance for the materialization of the inventive effect.

The polyoxyalkylene blocks comprise oxyethylene and oxypropylene units, the molecular weight of the polyoxyalkylene blocks in each case being 1400 to 3000. The mole ratio of oxyethylene to oxypropylene units, expressed by the ratio of x : y, is 0.8 : 2.2 and preferably 0.9 to 1.6.

Examples of compounds, which are to be used pursuant to the invention, are:

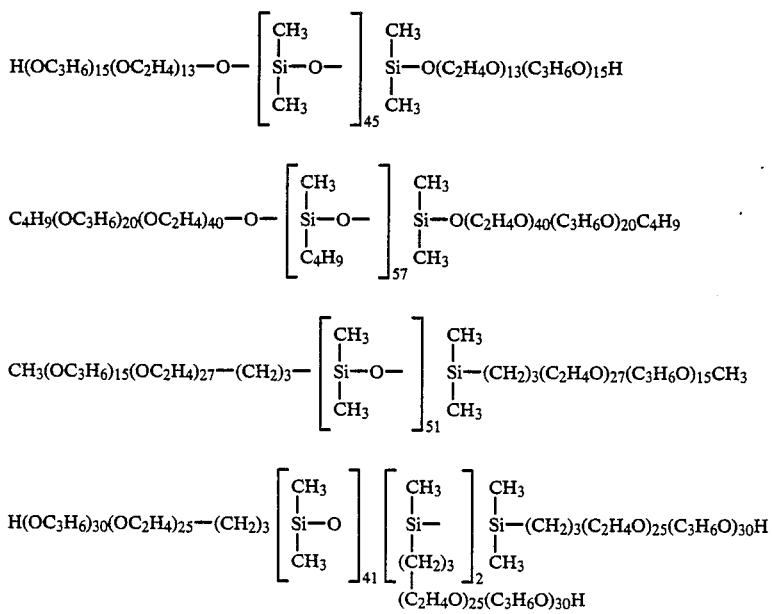

The compounds are added to the paints in amounts of 0.001 to 0.5% by weight, based on the paint. In this connection, the term "paint" is deemed to refer to the form of the paint in which it is ready to be used for coating purposes.

The compounds, to be used pursuant to the invention, accumulate at the surface of the cured paint system and bring about an improvement in the scratch resistance there and an increase in the sliding ability. This leads to a decrease in or avoidance of the surface defects in freshly painted surfaces, as described above. Essentially, the improvement in the surface properties is temporary, since the compounds are removed in the course of time from the painted surface by being washed off or dislodged by mechanical effects.

The compounds may be synthesized in known manner by reacting appropriate halogensiloxanes, which optionally may contain sulfate groups linked to Si atoms, with polyoxyalkylene glycols, their monoethers or monoesters, for example, in accordance with U.S. Pat. No. 3,115,512. It is also possible to transesterify the appropriate alkoxysiloxanes with polyoxyalkylene monoethers or polyoxyalkylene monoesters. The transesterification reaction is catalyzed by alkali metal hydroxides or by acids, such as trifluoroacetic acid and is desribed in the German Patent Nos. 1,012,602 and 1,040,251.

The block copolymers, in which the polyoxyalkylene blocks are linked to siloxy units over SiC bonds, may also be synthesized by the addition reaction of polyoxyalkylene ethers of olefinically unsaturated alcohols, such as allyl polyoxyalkylene ethers, with appropriate hydrogensiloxanes. This reaction is catalyzed by platinum compounds and is described, for example, in the German Patent No. 1,165,028.

Any amounts of free polyoxyalkylene glycols or their monoethers or monoesters, which may be present in the compounds as a result of the synthesis can be tolerated and do not have to be removed from the product.

In the following, the application properties of different compounds, to be used in accordance with the invention, are shown.

The following paint formulations (A) to (F) are selected to examine the application properties (quantities given in weight percent).

| | | |
|---|---|---|
| (A) | Acrylate resin (50% solution)[1] | 54.50 |
| | Epoxide resin (equivalent weight approx. 450)[2] | 8.10 |
| | TiO$_2$ | 19.50 |
| | Cellulose acetobutyrate (35% in ethylene glycol acetate) | 7.00 |
| | Xylene | 2.85 |
| | Ethylhexanol | 1.90 |
| | Tetralin | 1.40 |
| | Butyl cellosolve | 4.75 |
| (B) | Medium-oil alkyd resin (oil content: approx. 30%; 60% in xylene)[3] | 60.00 |
| | TiO$_2$ | 20.00 |
| | β-Copper phthalocyanine | 4.00 |
| | Polyamineamide | 0.50 |
| | Calcium naphthenate | 0.50 |
| | Ethyl cellosolve | 3.00 |
| | Solvesso 100 | 2.50 |
| | Lead octoate | 2.00 |
| | Ketoxime | 0.30 |
| | Xylene | 7.20 |
| (C) | Alkyd resin (oil content approx. 33%; 60% in xylene)[4] | 51.20 |
| | Melamine resin (70% in butanol)[5] | 14.60 |
| | TiO$_2$ | 24.60 |

-continued

| | | |
|---|---|---|
| | Butanol | 0.80 |
| | Ethyl glycol acetate | 1.60 |
| | Xylene | 7.20 |
| (D) | Nitrocellulose[6] | 10.00 |
| | Ethyl acetate | 26.00 |
| | Butyl acetate | 20.00 |
| | Isopropanol | 10.00 |
| | Toluene | 15.00 |
| | Xylene | 5.00 |
| | "Short-oil" alkyd resin (60% in xylene)[7] | 10.00 |
| | Dioctyl phthalate | 3.00 |
| | Silicate | 1.00 |
| (E) | Acrylate resin (60% in xylene, ethyl glycol acetate)[8] | 51.10 |
| | Lead chromate | 13.50 |
| | Xylene | 5.20 |
| | Butyl acetate | 5.20 |
| | Ethyl glycol acetate | 4.25 |
| | Dibutyl tin dilaurate | 0.15 |
| | Diethanolamine | 0.20 |
| | Isocyanate[9] | 20.40 |
| (F) | Polyester (75% in xylene)[10] | 28.40 |
| | Copolymer (PVC, PVAc, PVA; 20% in ethyl glycol acetate) | 10.00 |
| | Ethyl acetate | 27.20 |
| | Methyl isobutyl ketone | 10.20 |
| | Toluene | 6.50 |
| | Ethyl glycol acetate | 3.40 |
| | Isocyanate[11] | 14.30 |

[1] Commercially available under the name of Paraloid AT 50
[2] Commercially available under the name of Epoxide Resin DER 671
[3] Commercially available under the name of Jagalyd TH 58 N
[4] Commercially obtainable under the name Setal 126 XX 60
[5] Commercially obtainable under the name Setamine US 132 BB 70
[6] Commercially obtainable under the name Walsroder NC Chips E 520
[7] Commercially obtainable under the name Alkydal E 411
[8] Commercially obtainable under the name Desmophen 1300
[9] Commercially obtainable under the name Desmodur IL
[10] Commercially obtainable under the name Macrynal SM 510 N
[11] Commercially obtainable under the name Desmodur N 75

Compounds 1 to 7 to be tested, correspond to the general formula I. $R^1$, $R^2$, $R^3$ and the subscripts n and m, as well as the ratio of x/y have the meanings and values given in Table 1.

TABLE 1

| Compound | $R^1$ | $R^2$ | $R^3$ | n | m | x/y | |
|---|---|---|---|---|---|---|---|
| 1 | CH$_3$ | —O— | C$_4$H$_9$ | 55 | 0 | 0.93 | of the invention |
| 2 | CH$_3$ | —(CH$_2$)$_3$— | H | 45 | 0 | 0.95 | of the invention |
| 3 | CH$_3$ | —(CH$_2$)$_3$— | H | 60 | 0.3 | 1.35 | of the invention |
| 4 | CH$_3$ | —(CH$_2$)$_3$— | H | 53 | 2.5 | 0.93 | of the invention |
| 5 | CH$_3$ | —O— | C$_4$H$_9$ | 15 | 0 | 1.35 | not of the invention |
| 6 | CH$_3$ | —(CH$_2$)$_3$— | H | 50 | 4 | 0.95 | not of the invention |
| 7 | CH$_3$ | —O— | C$_4$H$_9$ | 98 | 0 | 0 | not of the invention |

Compounds 1 to 7 are mixed into a paint of formulation (A) in concentrations of 0.05% to 0.1% by weight. The paints are subsequently applied on bonderized sheet metal (type 1401) in a layer thickness of 90 mm using a doctor blade and cured at temperatures that correspond to the particular vehicle. To measure the sliding resistance values G of the paint surface, a weight stone (500 g), faced with a felt overlay, is pulled at a constant speed (12.8 mm/sec) over the horizontal paint surface. The G values (gram force), given in Table 2, are average values from several measurements.

TABLE 2

| Concentration Compound | Sliding Resistance 0.05% by weight | G gram force) 0.1% by weight | |
|---|---|---|---|
| 1 | 48 | 45 | of the invention |
| 2 | 41 | 34 | of the invention |
| 3 | 40 | 35 | of the invention |
| 4 | 52 | 48 | of the invention |

TABLE 2-continued

| Concentration Compound | Sliding Resistance 0.05% by weight | G gram force) 0.1% by weight | |
|---|---|---|---|
| 5 | 220 | 100 | not of the invention |
| 6 | 82 | 75 | not of the invention |
| 7 | 105 | 98 | not of the invention |
| no addition | 266 | | |

The additives, used pursuant to the invention, are distinguished by their universal applicability. This is confirmed by the sliding resistance values G in Table 3. To determine the sliding resistance values G, the additives are worked into the paints (A) to (F) in concentrations of 0.025%, 0.05% and 0.1% by weight. The paints are applied by air spraying on bonderized sheet metal (Type 1401) in a layer approx. 100μ thick and cured. The G values are determined as described above.

TABLE 3a

| Additive | Addition % by weight | Sliding Resistance Values G (gram force) of Painted Surfaces Paint According to Formulation | | |
|---|---|---|---|---|
| | | A | B | C |
| none | | 266 | 228 | 282 |
| Compound 3 (of the invention) | 0.025 | 48 | 84 | 56 |
| | 0.05 | 40 | 38 | 47 |
| | 0.1 | 35 | 29 | 40 |
| Comparison Product A | 0.025 | 194 | 230 | 170 |
| | 0.05 | 123 | 222 | 116 |
| | 0.1 | 105 | 154 | 84 |
| Comparison Product B | 0.025 | 90 | 179 | 53 |
| | 0.05 | 94 | 123 | 47 |
| | 0.1 | 93 | 93 | 43 |
| Comparison Product C | 0.025 | 84 | 89 | 81 |
| | 0.05 | 65 | 78 | 75 |
| | 0.1 | 55 | 53 | 78 |
| Comparison Product D | 0.025 | 216 | 176 | 107 |
| | 0.05 | 209 | 123 | 84 |
| | 0.1 | 107 | 79 | 70 |
| Comparison Product E | 0.025 | 71 | 139 | 82 |
| | 0.05 | 56 | 113 | 72 |
| | 0.1 | 53 | 96 | 66 |

TABLE 3b

| Additive | Addition % by weight | Sliding Resistance Values G (gram force) of Painted Surfaces Paint According to Formulation | | |
|---|---|---|---|---|
| | | D | E | F |
| none | | 140 | 366 | 236 |
| Compound 3 (of the invention) | 0.025 | 100 | 63 | 56 |
| | 0.05 | 85 | 56 | 56 |
| | 0.1 | 80 | 45 | 53 |
| Comparison Product A | 0.025 | 130 | 218 | 236 |
| | 0.05 | 130 | 121 | 211 |
| | 0.1 | 140 | 92 | 189 |
| Comparison Product B | 0.025 | 128 | 106 | 146 |
| | 0.05 | 115 | 105 | 131 |
| | 0.1 | 112 | 100 | 115 |
| Comparison | 0.025 | 119 | 79 | 209 |

TABLE 3b-continued

| Additive | Addition % by weight | Sliding Resistance Values G (gram force) of Painted Surfaces Paint According to Formulation | | |
|---|---|---|---|---|
| | | D | E | F |
| Product C | 0.05 | 94 | 72 | 187 |
| | 0.1 | 100 | 66 | 86 |
| Comparison Product D | 0.025 | 112 | 232 | 106 |
| | 0.05 | 100 | 246 | 97 |
| | 0.1 | 100 | 154 | 90 |
| Comparison Product E | 0.025 | 127 | 70 | 101 |
| | 0.05 | 110 | 67 | 89 |
| | 0.1 | 100 | 54 | 85 |

Comparison Product A commercially available under the name of Byk 300

Comparison Product B commercially available under the name of Byk 320

Comparison Product C commercially available under the name of Dow Corning PA 11

Comparison Product D commercially available under the name of Wacker LO

Comparison Product E commercially available under the name of Borchers LAC 80

We claim:

1. In a coating composition selected from the group consisting essentially of a paint, a lacquer or a varnish adapted to be applied to a substrate to form a scratch-resistant coating on the substrate which has pronounced sliding capability, the improvement which comprises that the composition comprises an amount effective to reduce sliding resistance of a compound of the general formula

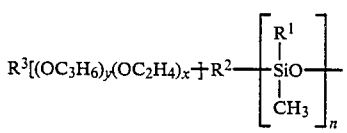

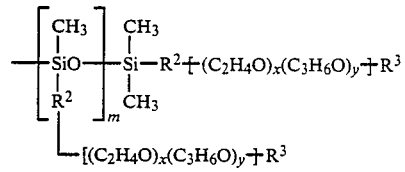

wherein
R$^1$ is alkyl with 1 to 8 carbon atoms,
R$^2$ is —O— or —(CH$_2$)$_p$O—, in which p = 2, 3 or 4,
R$^3$ is hydrogen, alkyl with 1 to 4 carbon atoms or acyl,
n is 40 to 60, and
m is 0 to 3,
x and y being selected so that the molecular weight of the polyoxyalkylene block is 1400 to 3000 and the molar ratio of x : y is 0.8 to 2.2.

2. The improvement of claim 1, wherein said effective amount is 0.001 to 0.5% by weight, based on the coating composition.

3. The improvement of claims 1 or 2, wherein R$^1$ is methyl.

4. The improvement of claims 1 or 2, wherein R$^1$ is linear alkyl.

5. The improvement of claims 1 or 2, wherein R$^1$ is a branched alkyl with 3 to 8 carbon atoms.

6. The improvement of claims 1 or 2, wherein R$^2$ is a divalent group which links siloxy to a polyoxyalkylene block.

7. The improvement of claim 6 wherein the linking between the Si atom of siloxy and the carbon atom of the polyoxyalkylene block is effected through oxygen or a carbon atom.

8. The improvement of claims 1 or 2, wherein R$^3$ is acetyl.

9. The improvement of claims 1 or 2, wherein m = 0 to 2.

10. The improvement of claims 1 or 2, wherein the polyoxyalkylene blocks of Formula I comprise oxyethylene units and oxypropylene units.

11. The improvement of claim 10, wherein the ratio of oxyethylene units to oxypropylene units is 0.9 : 1.6.

12. The improvement as claimed in claim 1, wherein said coating composition is a paint, a lacquer or a varnish and said substrate is wood or metal.

* * * * *